(12) United States Patent
Wan

(10) Patent No.: US 11,771,992 B2
(45) Date of Patent: Oct. 3, 2023

(54) INFORMATION PROCESSING METHOD, APPARATUS, AND DEVICE, AND STORAGE MEDIUM

(71) Applicant: NETEASE (HANGZHOU) NETWORK CO., LTD., Zhejiang (CN)

(72) Inventor: Qiang Wan, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 17/996,934

(22) PCT Filed: Oct. 30, 2020

(86) PCT No.: PCT/CN2020/125571
§ 371 (c)(1),
(2) Date: Oct. 24, 2022

(87) PCT Pub. No.: WO2021/218093
PCT Pub. Date: Nov. 4, 2021

(65) Prior Publication Data
US 2023/0166190 A1 Jun. 1, 2023

(30) Foreign Application Priority Data
Apr. 27, 2020 (CN) .......................... 202010347058.9

(51) Int. Cl.
*A63F 13/577* (2014.01)
(52) U.S. Cl.
CPC ...... *A63F 13/577* (2014.09); *A63F 2300/643* (2013.01)
(58) Field of Classification Search
CPC ........ A63F 13/577; A63F 13/57; A63F 13/55; A63F 2300/643; A63F 2300/64
(Continued)

(56) References Cited

U.S. PATENT DOCUMENTS 9,468,845 B2 10/2016 Mehra et al.
10,235,764 B2 * 3/2019 Kuang ................... G06T 19/00
(Continued)

FOREIGN PATENT DOCUMENTS

CN 102393646 A 3/2012
CN 102810209 A 12/2012
(Continued)

OTHER PUBLICATIONS

1st Office Action dated Feb. 1, 2021 of Chinese Application No. 202010347058.9.
(Continued)

*Primary Examiner* — Allen Chan
(74) *Attorney, Agent, or Firm* — Qinghong Xu

(57) ABSTRACT

An information processing method, apparatus, and device, and a storage medium, relating to the technical field of games. The method includes: detecting, by means of a first collider of a virtual object in a game scene, whether an interaction occurs between the virtual object and a virtual vehicle; calculating a second speed of the virtual vehicle after interaction and state information of the virtual object according to attribute information of the virtual vehicle, a first speed of the virtual vehicle before interaction, and attribute information of the virtual object; adding a second collider for simulating the motion of the virtual object to the virtual object; and according to the second speed of the virtual vehicle after interaction and the state information of the virtual object, on the basis of the second collider, simulating the motion of the virtual object after interaction with the virtual vehicle.

20 Claims, 12 Drawing Sheets

(58) Field of Classification Search
USPC .......................................................... 463/31
See application file for complete search history.

(56) References Cited

U.S. PATENT DOCUMENTS

| | | | | |
|---|---|---|---|---|
| 10,384,346 | B2* | 8/2019 | Hickman | ............... G06N 20/00 |
| 11,617,953 | B2* | 4/2023 | Schroeder | ............... G06F 3/016 |
| | | | | 463/31 |
| 2017/0256088 | A1* | 9/2017 | Joffe | ....................... G06F 9/453 |
| 2018/0005426 | A1 | 1/2018 | Desjardins et al. | |
| 2019/0103026 | A1 | 4/2019 | Liu et al. | |

FOREIGN PATENT DOCUMENTS

| CN | 103722565 A | 4/2014 |
|---|---|---|
| CN | 104408774 A | 3/2015 |
| CN | 106215419 A | 12/2016 |
| CN | 108434734 A | 8/2018 |
| CN | 108460791 A | 8/2018 |
| CN | 108540454 A | 9/2018 |
| CN | 108579085 A | 9/2018 |
| CN | 108939418 A | 12/2018 |
| CN | 109529317 A | 3/2019 |
| CN | 110047143 A | 7/2019 |
| CN | 110232741 A | 9/2019 |
| CN | 110772784 A | 2/2020 |
| CN | 111514587 A | 8/2020 |
| CN | 111062135 A | 4/2022 |

OTHER PUBLICATIONS

Notice of Allowance dated Apr. 15, 2021 of Chinese Application No. 202010347058.9.
International Search Report dated Jan. 27, 2021 of International Application No. PCT/CN2020/125571.

* cited by examiner

INFORMATION PROCESSING METHOD, APPARATUS, AND DEVICE, AND STORAGE MEDIUM

CROSS REFERENCE

The present application is a U.S. national phase application of International Application No. PCT/CN2020/125571, filed on Oct. 30, 2020, which claims priority to Chinese Patent Application No. 202010347058.9, filed on Apr. 27, 2020 and entitled "INFORMATION PROCESSING METHOD, APPARATUS, AND DEVICE, AND STORAGE MEDIUM", and the entire content thereof is incorporated herein by reference.

TECHNICAL FIELD

The present disclosure relates to the field of game technology, and in particular, to an information processing method, an apparatus, a device, and a storage medium.

BACKGROUND

In recent years, virtual vehicle control in games has become one of the important ways to play in a large number of games. With the increasing requirements for game quality, a realistic interaction process between a vehicle and an object in a game scene has become a common requirement. How to effectively and realistically simulate the interaction process between the vehicle and the object in a complex scene is an important research direction.

SUMMARY

In one aspect, embodiments of the present disclosure provide an information processing method, which includes:

detecting, based on a first collider of a virtual object in a game scene, whether an interaction occurs between the virtual object and a virtual vehicle;

calculating, in response to detecting that the interaction occurs between the virtual object and the virtual vehicle, a second speed of the virtual vehicle after the interaction and state information of the virtual object after the interaction, according to attribute information of the virtual vehicle, a first speed of the virtual vehicle before the interaction, and attribute information of the virtual object;

adding to the virtual object a second collider for simulating motion of the virtual object; and simulating, based on the second collider, the motion of the virtual object after the interaction occurs between the virtual object and the virtual vehicle, according to the second speed of the virtual vehicle after the interaction and the state information of the virtual object after the interaction.

In another aspect, embodiments of the present disclosure further provide an information processing apparatus, including a detection module, a calculation module, an adding module, and a simulation module, wherein the detection module is configured to detect, based on a first collider of a virtual object in a game scene, whether an interaction occurs between the virtual object and a virtual vehicle;

the calculation module is configured to calculate, in response to detecting that the interaction occurs between the virtual object and the virtual vehicle, a second speed of the virtual vehicle after the interaction and state information of the virtual object after the interaction, according to attribute information of the virtual vehicle, a first speed of the virtual vehicle before the interaction, and attribute information of the virtual object;

the adding module is configured to add to the virtual object a second collider for simulating motion of the virtual object; and the simulation module is configured to simulate, based on the second collider, the motion of the virtual object after the interaction occurs between the virtual object and the virtual vehicle, according to the second speed of the virtual vehicle after the interaction and the state information of the virtual object after the interaction.

In another aspect, embodiments of the present disclosure provide an information processing device, including a processor, a storage medium, and a bus, wherein the storage medium stores program instructions executable by the processor, and when the information processing device operates, the processor and the storage medium communicate through the bus, and the processor executes the program instructions, to implement the information processing method according to above aspects.

In another aspect, embodiments of the present disclosure provide a computer-readable storage medium having a computer program stored thereon, which when executed by a processor, cause the information processing method according to above aspects to be implemented.

BRIEF DESCRIPTION OF THE DRAWINGS

For explaining technical solutions of embodiments of the present disclosure more clearly, drawings that need to be used in embodiments will be introduced briefly in the following. It should be understood that the following drawings only show some embodiments of the present disclosure, and therefore do not be regarded as a limitation of the scope. For those of ordinary skill in the art, other related drawings can also be obtained according to these drawings without any creative efforts.

DETAILED DESCRIPTION

Figure 1:
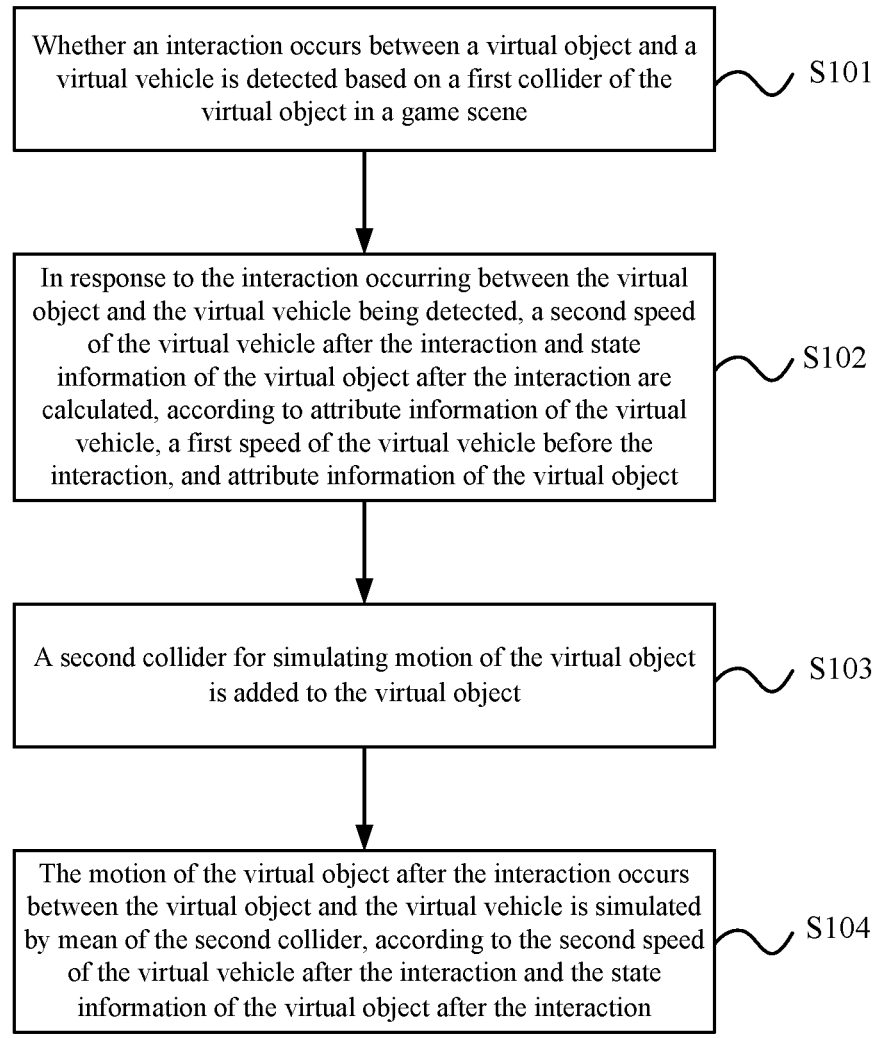
FIG. 1 is a schematic flowchart of an information processing method according to an embodiment of the present disclosure.

In order to make purposes, technical solutions and advantages of embodiments of the present disclosure clearer, technical solutions according to embodiments of the present disclosure will be described clearly and completely below with reference to the drawings according to embodiments of the present disclosure. Obviously, embodiments described are some, but not all, embodiments of the present disclosure.

Before the present disclosure, for an interaction simulation between a virtual vehicle and a virtual object in a game scene, a dynamic rigid body corresponding to a shape and physical parameters of the virtual object will be generally created, and then a simulation is performed through a physical engine. For example, the virtual vehicle strikes the virtual object on the ground in the game scene, such as a virtual box, virtual gravel, etc. However, there are often a large number of more complex virtual objects in the game scene, which can also be referred to as a virtual object constrained by the ground, such as a virtual tree, a virtual telegraph pole, a virtual sign, etc. These virtual objects are constrained by the ground, for example, tree roots growing under the ground, thus although such virtual objects themselves can be equivalent to rigid bodies, true interaction processes between such virtual objects and virtual vehicle cannot be realistically represented when these virtual objects are modeled as simple dynamic rigid bodies only. Different schemes are often adopted under different cases for the interaction processes between such virtual objects and the virtual vehicle.

A first scheme is for a case where, when mass and volume of a virtual object are not large, such as a wooden fence, a sign, etc., a method of establishing a physical fragmentation model is often used to simulate the interaction process between the virtual object and the virtual vehicle. In occasions with high performance and flexibility requirements, special effects can be played or displayed to represent the interaction process.

A second scheme is for a case where, for some objects that cannot be completely destroyed, such as trees, etc., animation is usually played or displayed to represent an entire interaction process. That is, at an instant when the virtual vehicle interacts with the virtual object, the animation made in advance is played or displayed for the virtual object. For the case where a high level of reality of the interaction is not required, the rigid body roughly corresponding to the shape and physical parameters of the virtual object can also be created, and then a simulation is performed through a physical engine to represent the interaction process.

A third scheme is for a case where, for some virtual objects with large shape and mass, such as a concrete telegraph pole, corresponding special effects will generally be played or displayed at a location the interaction occurs, and then appropriate decals or other effects will be added to the virtual vehicle and the virtual object, respectively, to represent influence left after the interaction.

Although above schemes for the interaction process between the virtual vehicle and the virtual object are simple and relatively mature, it cannot meet the requirements for occasions with high quality and detail requirements. These schemes may result following technical problems.

A first problem is that a behavior representation of the virtual object during the interaction is not realistic enough, and performance consumption is large in some cases. Although in some cases, the physical fragmentation model of the virtual object can be established to simulate a process of the object being completely destroyed by the vehicle during the entire interaction, it is the physical fragmentation model itself not only takes up a large number of memories and has large performance consumption, but also is not flexible enough in a large world simulation. For example, the physical fragmentation model does not support scaling and cannot be interspersed with the ground, which greatly increases the workload and resources needed in scene production. For some virtual objects, although the method of creating a dynamic rigid body to simulate motion of the virtual object during the interaction is very simple, and can be supported by the physical engine, the characteristics of virtual objects being constrained by the ground cannot be represented still. In addition, when the interaction process in a complex scene is simulated, problems such as jitter may occur due to factors such as numerical instability.

A second problem is that a behavior representation of the virtual vehicle during the interaction is not realistic and smooth enough. In the physical engine, all static virtual objects interactable in the game scene are characterized in infinite mass, thus when the virtual vehicle collides with the virtual object, an unrealistic behavior representation such as instant stop often occurs. In some cases, for performance reasons, the virtual object can only provide a scene query characteristic, such as a Trigger type collider in the physical engine. As a result, when the virtual vehicle collides with the virtual object, there is no physical interaction between the virtual vehicle and the virtual object, and only relevant information of the virtual vehicle and the virtual object can be queried and obtained when the interaction occurs, thus no behavior representations exist during the interaction.

A third problem is that synchronization of the interaction process results in certain consumption. In a case where multiple people are online at the same time, in order to ensure between different clients consistency of the interaction process between the virtual vehicle and the virtual object, it is necessary to synchronize the entire interaction process. Since number of states of virtual objects in the interaction process is often large, and a server needs to send corresponding synchronization information to almost all clients, traffic consumption due to synchronization of the interaction process will increase significantly in a case where the interaction between the virtual vehicle and the virtual object frequently occurs. In addition, frequently receiving and sending synchronization information will also lead to increased power consumption of a terminal.

In order to solve above technical problems, embodiments of the present disclosure provide an information processing method. Core improvements of the method include, in a case where the entire interaction process cannot be simulated simply by using the physical engine, the virtual object is modeled and states of the virtual vehicle during its motion are calculated, so that the behavior representations of the virtual vehicle and the virtual object during the interaction are sufficiently realistic and stable. The entire interaction process can be uniquely determined through the states of the virtual vehicle and the information of the virtual object when the interaction occurs, thus the entire interaction process can be simulated on different clients only by synchronizing initial information of the interaction, which effectively reduces the consumption in the synchronization of the interaction process.

Technical solutions of the present disclosure will be described below through embodiments.

FIG. 1 is a schematic flowchart of an information processing method according to an embodiment of the present disclosure. An execution subject of the method of the present disclosure may be an information processing device, and the information processing device may be a game server or a game client.

In a case where the execution subject is a game client, the information processing method can be implemented by executing corresponding software codes by a processing device, such as a processor, of the game client installed with a game application, or can be implemented by executing the corresponding software codes by the processing device of the game client, and in combination with other hardware entities. The game client may be an electronic device, and the electronic device may be, for example, a desktop computer, a notebook, a personal digital assistant (PDA), a smart phone, a tablet computer, or a game console. Embodiments will be described by taking an electronic device as the execution subject as an example. When the execution subject is a game server, the method will be performed similarly, and details are not described herein.

The processing device of the game client can execute a game application and render and generate a graphical user interface on a display device. During generation of the graphical user interface, a scene interface can also be rendered and generated on the graphical user interface, so that a game scene can be displayed in the scene interface. The game scene includes the virtual vehicle and the virtual object according to embodiments of the present disclosure.

According to embodiments, a user can download the game application or a web program of a browser and install the game application or the web program on the game client. When the game application runs on the game client, the graphical user interface will be rendered and generated on the display device. The display device mentioned above may be a display device of the game client, or may be an external-connected display device of the game client, that is, a display device connected to the game client.

As shown in FIG. 1, the method according to embodiments may include following steps.

In a step S101, whether an interaction occurs between a virtual object and a virtual vehicle is detected based on a first collider of the virtual object in a game scene.

First of all, it should be noted that collision detection is a basis of all interaction behaviors between virtual objects in the game scene, or between a game character controlled by a player and the virtual objects. The virtual objects may include, but are not limited to, environmental objects (e.g., flowers and trees), terrain objects (e.g., mountains, rivers, etc.), architecture objects (e.g., buildings, factories, walls, etc.), virtual vehicles (e.g., mounts, cars, ships, etc.), game characters controlled by other players, NPCs (non-player characters), etc. In the game, the collision detection can be performed through a collider constructed based on a virtual object model, and the collider can be configured to at least include a part of the virtual object model. For example, collision determination is made based on whether or not bounding boxes of virtual object models overlap partially or completely. In addition, the collision detection can also be performed by determining whether other virtual objects are located within an interaction range based on rays emitted by a certain virtual object. A collision detection method can be selected according to specific requirements, and embodiments of the present disclosure are not limited to this.

According to embodiments, whether an interaction occurs between the virtual object and the virtual vehicle can be detected through colliders of the virtual object and the virtual vehicle. Before an interaction detection, a collider corresponding to the virtual object and a collider corresponding to the virtual vehicle may be added to the virtual object and the virtual vehicle in advance. Herein, above first collider may be referred to as a detection collider, and collision detection between the virtual object and the virtual vehicle can be achieved by adding this collider to the virtual object.

According to embodiments of the present disclosure, the virtual vehicle may be a virtual car in the game scene, such as a virtual motorcycle, a virtual buggy, etc., used by a game character in PUBG game. The virtual object may be an object constrained by the ground, such as a virtual tree and a virtual telegraph pole in the game scene. When the interaction occurs between the virtual object and the virtual vehicle, that is, after a collision occurs, motion states of both the virtual vehicle and the virtual object will change. The interaction process can be simulated according to the motion states of the virtual vehicle and the virtual object after the interaction, which enables the interaction process to be more realistic.

A shape of the first collider of the virtual object can generally be configured as a bounding box of a part of the virtual object that can interact with the virtual vehicle, such as a trunk part of a virtual tree. When the virtual tree collides with the virtual vehicle, usually the trunk part of the virtual tree collides with the virtual vehicle, thus the shape of the first collider of the virtual tree can be configured as a bounding box of the trunk part of the virtual tree. For different virtual objects, the shape of the collider can be configured according to its own properties.

In addition to the first collider mentioned above, a collider that brings a specific role of the object into play can also be added to the virtual object. For example, when the virtual object is a virtual tree, a collider that brings a tree-specific role into play can be added to the virtual tree, such as vision occlusion and halo effects of the virtual tree. A shape of the collider is consistent with a size of a bounding box of the virtual object. In some occasions with higher precision requirements, a single or even multiple convex geometry can be used for approximation. Difference between the collider that brings a specific role of the object into play and the first collider is that the shape of the collider is configured as the size of the bounding box of the virtual object, not only configured as the bounding box of the part of the virtual object that can interact with the virtual vehicle. Still the virtual object is the virtual tree is taken as an example, the collider that brings a specific role into play is added for the virtual tree, and the shape of the collider may be the bounding box of the entire tree, including the trunk and leaves.

In a step S102, in response to the interaction occurring between the virtual object and the virtual vehicle being detected, a second speed of the virtual vehicle after the interaction and state information of the virtual object after the interaction are calculated, according to attribute information of the virtual vehicle, a first speed of the virtual vehicle before the interaction, and attribute information of the virtual object.

In some embodiments, after the interaction occurs between the virtual object and the virtual vehicle, motion states of the virtual object and the virtual vehicle will change. State information of the virtual vehicle after the interaction and the state information of the virtual object after the interaction can be calculated, according to some attribute information of the virtual vehicle and the virtual object and a motion state of the virtual vehicle corresponding to a frame before the interaction occurs.

In some embodiments, in addition to adding the first collider and the collider that brings a specific role into play for the virtual object, a flag bit for identifying a type of the virtual object may also be set. The type of the virtual object can be identified through the flag bit, so that when it detects that the interaction occurs between the virtual object and the virtual vehicle, the type of the virtual object can be determined according to the flag bit of the virtual object. That is, what the virtual object specifically is can be determined, so as to obtain the attribute information of the virtual object according to the type of the virtual object determined.

According to embodiments, the flag bit for identifying the type of the virtual object is set, so that when the virtual vehicle interacts with the virtual object, the virtual object can be modeled according to the type of the virtual object in a logic of processing the interaction.

Similarly, a flag bit can also be set for the virtual vehicle, so as to achieve the same function as the flag bit of the virtual object.

In a step S103, a second collider for simulating motion of the virtual object is added to the virtual object.

In some embodiments, the first collider mentioned above is used to detect whether an interaction occurs between the virtual object and the virtual vehicle, and after it is detected that the interaction occurs, simulation of an interaction process needs to be performed. The second collider that can simulate the motion of the virtual object can be added, which is also referred to as an interaction collider. How to generate the second collider can be understood according to specific explanations of following related steps.

In a step S104, the motion of the virtual object after the interaction occurs between the virtual object and the virtual vehicle is simulated by mean of the second collider, according to the second speed of the virtual vehicle after the interaction and the state information of the virtual object after the interaction.

Generally, when the interaction occurs between the virtual vehicle and the virtual object, an interaction with relatively ideal simulation effects cannot be obtained depending on the simulation of the physics engine only. According to embodiments of the present disclosure, the simulation of the interaction process between the virtual object and the virtual vehicle can be realized based on the second collider of the virtual object according to a calculated state information, such as a speed, of the virtual vehicle after the interaction and the state information of the virtual object after the interaction.

According to the information processing method provided in embodiments, whether an interaction occurs between a virtual object and a virtual vehicle is detected based on a first collider of the virtual object in a game scene; in response to the interaction occurring between the virtual object and the virtual vehicle being detected, a second speed of the virtual vehicle after the interaction and state information of the virtual object after the interaction are calculated, according to attribute information of the virtual vehicle, a first speed of the virtual vehicle before the interaction, and attribute information of the virtual object; a second collider for simulating motion of the virtual object is added to the virtual object; the motion of the virtual object after the interaction occurs between the virtual object and the virtual vehicle is simulated by mean of the second collider, according to the second speed of the virtual vehicle after the interaction and the state information of the virtual object after the interaction. According to embodiments, unrealistic behavior presentations and operation experience caused by no consideration of influence on the virtual vehicle exerted by the virtual object during the interaction can be effectively improved, by simulating based on the second collider the motion of the virtual object after the interaction occurs between the virtual object and the virtual vehicle, according to the calculated speed of the virtual vehicle after the interaction and the state information of the virtual object, which enables the simulation effect of the interaction process to be more realistic and the customer experience to be higher.

Further, according to embodiments, the parameter information during the whole interaction process can be uniquely determined according to the state information of the virtual object after the interaction and the second speed of the virtual vehicle after the interaction, so that the synchronization of the interaction process can be very simple, which effectively reduces the consumption in the synchronization of the interaction process.

According to embodiments, in above step S102, the state information of the virtual object after the interaction may include an angular velocity of the virtual object rotating around a constraint point.

According to embodiments, above step S102, in which a second speed of the virtual vehicle after the interaction and state information of the virtual object are calculated, according to attribute information of the virtual vehicle, a first speed of the virtual vehicle before the interaction, and attribute information of the virtual object, may include the following step, the second speed of the virtual vehicle after the interaction and the angular velocity of the virtual object rotating around the constraint point are calculated, according to mass of the virtual vehicle, the first speed of the virtual vehicle before the interaction, and the attribute information of the virtual object.

According to embodiments, the attribute information of the virtual vehicle may include information such as mass, a wheel radius, and a gear ratio of different gears of the virtual vehicle. According to embodiments, the type of the virtual vehicle can be determined by identifying the flag bit of the virtual vehicle, so as to obtain the attribute information of the virtual vehicle according to the type of the virtual vehicle. Similarly, the attribute information of the virtual object may also include information such as mass, a bottom diameter, a height of the virtual object.

In consideration that an internal force between the virtual object and the virtual vehicle is much greater than an external force during the interaction, the momentum is approximately conserved, and the following relationship can be obtained: $m_1 v + I_1 w = m_1 v_1$, where $m_1$ is the mass of the virtual vehicle, $v_1$ is the first speed of the virtual vehicle before the interaction, and $v$ is the second speed of the virtual vehicle after the interaction.

The virtual object in a motion simulation is usually equivalent to be an appropriate cylinder, thus the moment of inertia $I_1$ of the virtual object rotating around the constraint point after the interaction can be calculated as:

$$I_1 = \frac{1}{12}m_2\left(3r^2 + \frac{5}{4}h^2\right),$$

where $m_2$ is the mass of the virtual object, r is an approximate radius of the virtual object, and h is an approximate height of the virtual object. In consideration that an average speed of the virtual object is the same as the second speed v of the virtual vehicle after the interaction, then a formula ½hw=v can be obtained, and thus the following can be obtained:

$$\begin{cases} v = \dfrac{m_1 h v_1}{2I_1 + m_1 h} \\ w = \dfrac{2m_1 v_1}{2I_1 + m_1 h} \end{cases},$$

where w is the angular velocity of the virtual object rotating around the constraint point after the interaction. As a result, the second speed v of the virtual vehicle after the interaction and the angular velocity w of the virtual object rotating around the constraint point after the interaction are calculated.

According to embodiments, the method provided by embodiments of the present disclosure may further include following steps, whether the mass of the virtual object is much greater than the mass of the virtual vehicle is determined. If it determines that the mass of the virtual object is much greater than the mass of the virtual vehicle, above step S102, in which the second speed of the virtual vehicle after the interaction is calculated, may include the following step, the second speed of the virtual vehicle after the interaction is obtained by decomposing the first speed of the virtual vehicle before the interaction according to a positional relationship between the virtual object and the virtual vehicle.

It should be noted that the method according to above embodiments is used to calculate the second speed of the virtual vehicle after the interaction when the mass of the virtual vehicle is greater than the mass of the virtual object.

Figure 2:
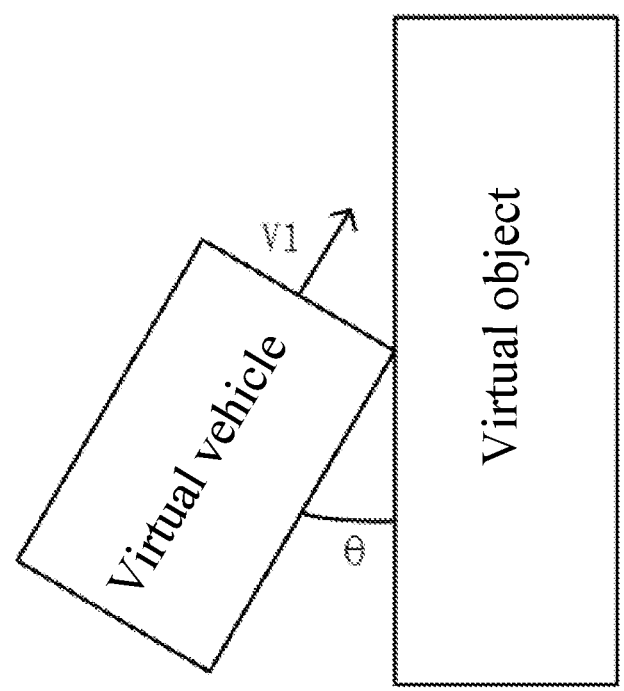
FIG. 2 is a schematic diagram of an interaction between a virtual vehicle and a virtual object according to an embodiment of the present disclosure.

FIG. 2 is a schematic diagram of an interaction between a virtual vehicle and a virtual object according to an embodiment of the present disclosure. In some cases, the mass of the virtual object may be much greater than the mass of the virtual vehicle, for example, a ratio of the mass of the virtual object to the mass of the virtual vehicle is greater than a preset threshold, so that a condition for conservation of momentum is no longer satisfied. For example, the virtual object is a concrete telegraph pole. When the virtual vehicle directly interacts with the virtual object with its front face, the speed of the virtual vehicle obtained through the physical engine or according to the above method is v≈0. However, in most cases, this is not consistent with reality. Therefore, it is necessary to decompose the first speed of the virtual vehicle before the interaction according to the positional relationship between the virtual vehicle and the virtual object. As shown in FIG. 2, when the virtual vehicle interacts with the virtual object with its side face, the second speed of the virtual vehicle after the interaction can be calculated according to the formula: v=v₁ cos θ, where θ is an included angle between the side face of the virtual vehicle and a surface of the virtual object when the interaction occurs between the virtual vehicle and the virtual object.

According to embodiments, the second speed of the virtual vehicle after the interaction is calculated according to different masses of the virtual vehicle and the virtual object, and is calculated by using respective methods, so that a second speed of the virtual vehicle of higher accurate can be obtained through calculation. The interaction simulation is performed according to the second speed obtained, and the accuracy of the simulation is also higher.

According to embodiments, the method provided by embodiments of the present disclosure may further include following step, a wheel rotation speed of the virtual vehicle after the interaction and an engine rotation speed of the virtual vehicle after the interaction are calculated according to the second speed of the virtual vehicle after the interaction.

Embodiments of the present disclosure not only provides a method for calculating the motion speed of the virtual vehicle after the interaction, but also provides a method for calculating the wheel rotation speed and the engine rotation speed of the virtual vehicle after the interaction.

When the virtual vehicle encounters an actual impact, the wheel rotation speed and the engine rotation speed of the virtual vehicle will also be affected due to instantaneous change of the state of the virtual vehicle. Therefore, in order to simulate this situation, after the second speed v of the virtual vehicle after the interaction is obtained through above calculation, it is necessary to further determine the state of the engine and the wheels of the virtual vehicle after the interaction, so that the motion process of the virtual vehicle satisfies the characteristics itself. For some specific virtual vehicle, the following conditions are generally satisfied during normal operation:

$$\begin{cases} \dfrac{v}{v_w} = H, v \neq 0, v_w \neq 0 \\ w_{eng} = G w_w, v_w = r_w w_w \end{cases},$$

where $v_w$ is a wheel linear speed, $w_{eng}$ is an engine rotation speed, G is the gear ratio of the engine to the wheel, $r_w$ is a radius of the wheel, and H>0 is a constant related to the type of virtual vehicle, thus it can be obtained:

$$\frac{v}{r_w w} = \frac{v_1}{r_w w_1},$$

where $w_1$ is a wheel rotation speed of the virtual vehicle before the interaction, thus for the wheel, it can be obtained:

$$w = \text{sign}(w_1) \min\left(|w_1|, \frac{v}{v_1}|w_1|\right),$$

where w is a wheel rotation speed of the virtual vehicle after the interaction.

For the engine, it can be obtained: $w_{eng}=\min(w_{eng}, G|w|)$, where $w_{eng}$ is the engine rotation speed of the virtual vehicle after the interaction. According to above, the wheel rotation speed and the engine rotation speed of the virtual vehicle after the interaction can be obtained.

It should be noted that, as described in previous embodiments, G is the gear ratio of the engine to the wheel, and $r_w$ is the radius of the wheel, which are all attribute information of the virtual vehicle, and will not be repeated here.

Figure 3:
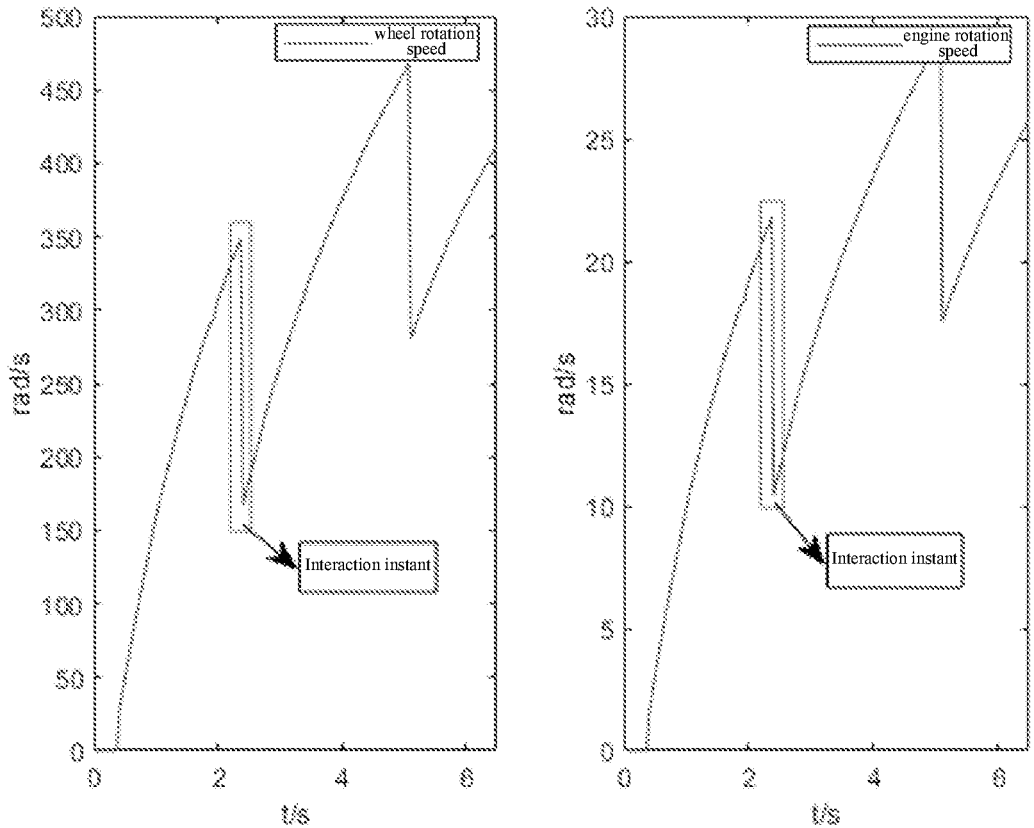
FIG. 3 is a schematic diagram of state change curves of an engine and a wheel of a virtual vehicle after the interaction according to an embodiment of the present disclosure.

FIG. 3 is a schematic diagram of state change curves of an engine and a wheel of a virtual vehicle after the interaction according to an embodiment of the present disclosure. It can be seen from the figure that running characteristics of the engine and the wheels of the virtual vehicle are almost the same before and after the interaction.

Simulation of the interaction process between the virtual object and the virtual vehicle will be described below through various embodiments. Before the simulation, the first collider added to the virtual object can be removed first, which can not only avoid repeated detection, but also reduce consumption of maintaining unnecessary colliders.

Figure 4:
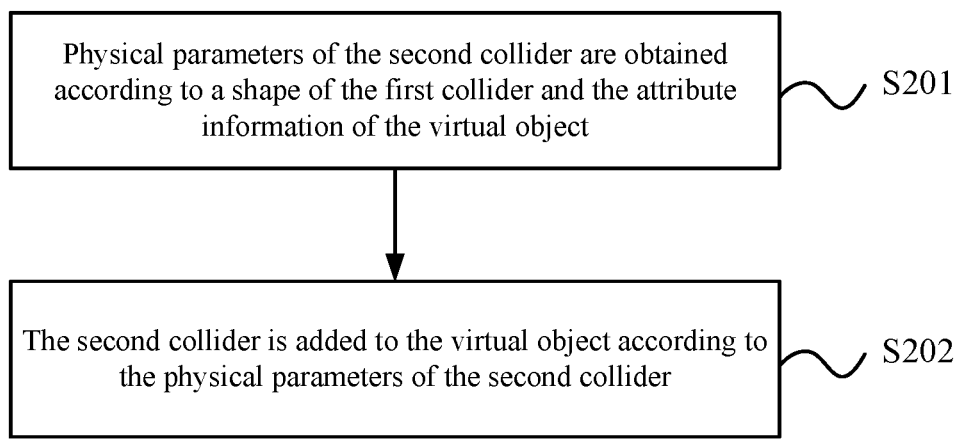
FIG. 4 is a schematic flowchart of another information processing method according to an embodiment of the present disclosure.

FIG. 4 is a schematic flowchart of another information processing method according to an embodiment of the present disclosure. As shown in FIG. 4, above step S103, in which the second collider for simulating the motion of the virtual object is added to the virtual object, may include following steps.

In a step S201, physical parameters of the second collider are obtained according to a shape of the first collider and the attribute information of the virtual object.

According to embodiments, the physical parameters of the second collider may be obtained according to parameter information of the first collider of the virtual object and the attribute information of the virtual object obtained in above embodiments.

According to embodiments, the physical parameters of the second collider may include a shape, a height, and a center of mass of the second collider.

Above step S201, in which physical parameters of the second collider are obtained according to a shape of the first collider and the attribute information of the virtual object, may include following aspects.

In a first aspect, the shape of the second collider is determined according to the shape of the first collider and a height of the virtual object.

The shape of the second collider can be determined through a convex geometry formed by points given below:

$$p_{i1} = \left(r_2 \cos\frac{\pi}{n}, 0, r_2 \sin\frac{\pi}{n}\right), p_{i2} = \left(r_2 \cos\frac{\pi}{n}, d, r_2 \sin\frac{\pi}{n}\right), i = 1, \ldots, n,$$

where $r_2$ equals to a half of a width of a bottom surface of the first collider; n represents number of surfaces of the convex geometry, generally $n \geq 3$, and the larger the number is, the finer the collider is, but it should be noted that the larger the number n is, the larger the physical memory the collider uses; d represents a height of the first collider, which can be determined according to the height of the virtual object itself and a height of a bottom of the virtual object away from the ground.

In a second aspect, the height of the second collider is determined according to a height of the virtual object relative to a ground in the game scene.

The height of the second collider can be calculated according to the following formula:

$$d' = h - \|p_0 - p_1\|,$$

where $p_0$ represents an intersection of the virtual object and the ground, which can be obtained through ray detection, $p_1$ represents a coordinate of the bottom of the virtual object, and h is the height of the virtual object.

The parameters such as the shape and the height of the second collider can be obtained through above calculation.

In a third aspect, the center of mass of the second collider is determined according to the height of the second collider.

In addition, the physical parameters of the second collider may further include the center of mass of the second collider, which can be determined according to the following formula:

$$p_{center} = \left(0, \frac{d}{2}, 0\right).$$

In addition, moment of inertia of the virtual object rotating around each axis needs to be calculated to determine moment of inertia of the second collider, which can be determined as:

$$\begin{cases} I_y = \frac{1}{2}m_2 r^2 \\ I_x = I_z = \frac{1}{12}m_2(3r^2 + d^2) \end{cases},$$

where $I_y$ represents the moment of inertia of the virtual object around axis y, and $I_x$ represents the moment of inertia of the virtual object around the axis x.

According to above embodiments, the physical parameters of the second collider, which may include parameters such as the shape, the height, the center of mass, and the moment of inertia of the second collider, can be obtained through calculation. In practical applications, the physical parameters of the second collider are not limited to above listed parameters. When more parameters of the second collider are acquired, the simulation accuracy of the second collider will be higher, which will accordingly result in more physical memory being used in corresponding simulation process. Necessary physical parameters can be adaptively selected to construct the second collider, which are not specifically limited in embodiments of the present disclosure.

In a step S202, the second collider is added to the virtual object according to the physical parameters of the second collider.

According to embodiments, the second collider can be constructed according to the physical parameters of the second collider obtained through above calculation. That is, the shape of the second collider is determined by the physical parameters, and the constructed second collider has physical properties corresponding to the physical parameters. The second collider is added to the virtual object, so that a physical simulation of the interaction process can be performed on the virtual object to which the second collider is added.

Figure 5:
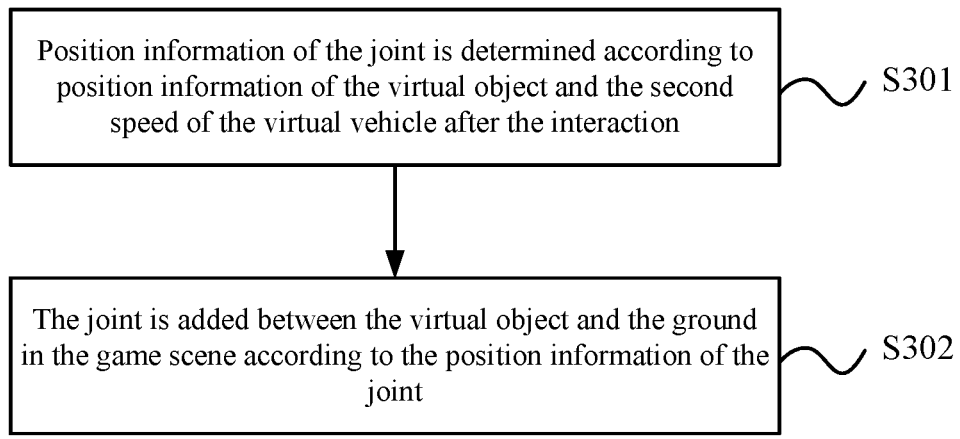
FIG. 5 is a schematic flowchart of another information processing method according to an embodiment of the present disclosure.

FIG. 5 is a schematic flowchart of another information processing method according to an embodiment of the present disclosure. As shown in FIG. 5, after calculating the second speed of the virtual vehicle after the interaction and the state information of the virtual object after the interaction in above step S102, the method provide by embodiments of the present disclosure may further include following steps.

A joint is added to the virtual object. The joint is used to simulate a constraint on the virtual object exerted by the ground in the game scene. Said adding a joint to the virtual object can be achieved through following steps.

In a step S301, position information of the joint is determined according to position information of the virtual object and the second speed of the virtual vehicle after the interaction.

Since the virtual object is constrained by the ground, when the ground-constrained virtual object interacts with the virtual vehicle, the virtual object will sway under the reaction of the ground after the interaction occurs, instead of showing unrealistic behavior presentations, such as knocked off by the virtual vehicle.

For example, in a case where the virtual object is a virtual tree and the virtual vehicle is a virtual car driving in the game scene, when the virtual vehicle interacts with the virtual object, for example, when the virtual car collides with the virtual tree and the virtual tree is pushed down, due to the certain constrain on the virtual tree exerted by the ground, the virtual tree will not separate itself from the ground completely. For example, the ground will exert a certain force on the root of the tree, thus the virtual tree cannot separate itself from the ground completely. At the same time, when the canopy of the tree hits the ground, there will be a cyclic process of first slowing down and then bouncing back.

In order to simulate above interaction process, a joint constraint is added in some embodiments, so as to simulate the constraint on the virtual object exerted by the ground. Other methods may also be adopted to perform similar simulations, which are not specifically limited in embodiments of the present disclosure.

In some embodiments, the position information of the joint can be determined according to the position information of the virtual object after the interaction and the second speed of the virtual vehicle after the interaction, through the following formula:

$$\begin{cases} p_{joint} = p_0 \\ q_{joint} = \left(0, 1, 0, \frac{1}{2}\text{atan2}(v_z, v_x)\right) \end{cases},$$

where $q_{joint}$ is a quaternion representation of rotation amount of the joint, $v_z$ and $v_x$ are respectively z-axis and x-axis components of the second speed of the virtual vehicle after the interaction, $p_{joint}$ represents a coordinate of the joint, and $p_0$ represents an intersection of the virtual object and the ground.

In a step S302, the joint is added between the virtual object and the ground in the game scene according to the position information of the joint.

In some embodiments, the joint can be added between the virtual object and the ground in the game scene according to the position information of the joint determined above, so as to simulate the joint constraint. According to embodiments, the joint is added, thus movements of the virtual object can be constrained in a specified plane, and the bottom of the virtual object cannot be separated from the ground, so that a good simulation of the constraint on the virtual object exerted by the ground.

It should be noted that, since the constraint on the virtual object exerted by the ground exists during entire simulation of the interaction process, the joint can be added in a first frame after the interaction occurring between the virtual object and the virtual vehicle is detected, so that constraint effects of the joint simulated are more accurate.

Figure 6:
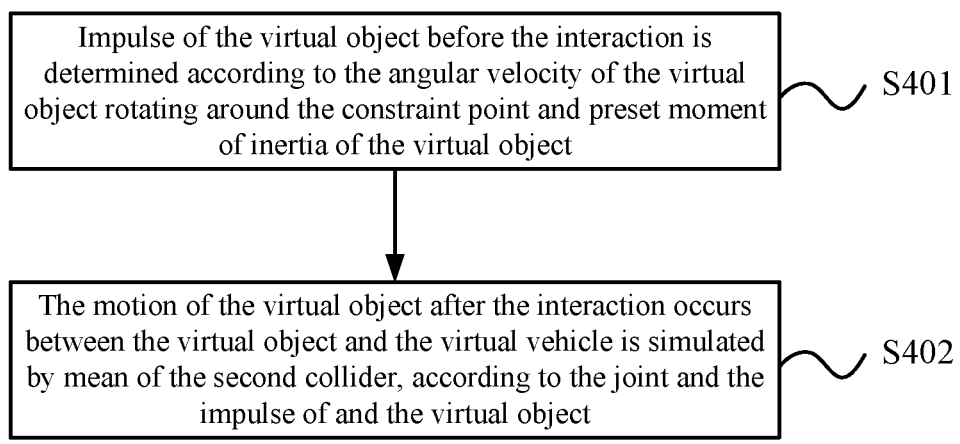
FIG. 6 is a schematic flowchart of another information processing method according to an embodiment of the present disclosure.

FIG. 6 is a schematic flowchart of another information processing method according to an embodiment of the present disclosure. As shown in FIG. 6, above step S104, in which the motion of the virtual object after the interaction occurs between the virtual object and the virtual vehicle is simulated, based on the second collider, according to the second speed of the virtual vehicle after the interaction and the state information of the virtual object after the interaction, may include following steps.

In a step S401, impulse of the virtual object before the interaction is determined according to the angular velocity of the virtual object rotating around the constraint point and preset moment of inertia of the virtual object.

In a step S402, the motion of the virtual object after the interaction occurs between the virtual object and the virtual vehicle is simulated by mean of the second collider, according to the joint and the impulse of and the virtual object.

In addition to added joint mentioned above, in some embodiments, magnitude of the impulse of the virtual object before the interaction can also be determined, so that after the interaction occurs, the virtual object moves under the action of the impulse.

According to embodiments, the impulse of the virtual object before the interaction can be determined through the formula: $P_{impulse} = I_w$, so that the simulation of the motion of the virtual object after the interaction can be performed by mean of the second collider, according to the added joint and the magnitude of the impulse of the virtual object.

Regarding above formula, where I represents the preset moment of inertia of the virtual object, and w represents the angular velocity of the virtual object rotating around the constraint point, which has been calculated in foregoing embodiments.

Figure 7:
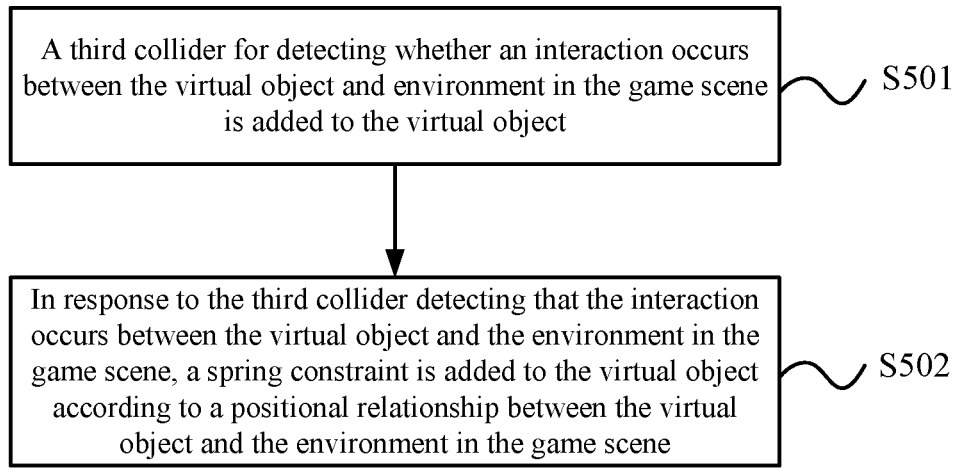
FIG. 7 is a schematic flowchart of an information processing method according to an embodiment of the present disclosure.

FIG. 7 is a schematic flowchart of an information processing method according to an embodiment of the present disclosure. As shown in FIG. 7, before above step S402, in which the motion of the virtual object after the interaction occurs between the virtual object and the virtual vehicle is simulated by mean of the second collider, according to the joint and the impulse of the virtual object, the method provided by embodiments of the present disclosure may further include following steps.

In a step S501, a third collider for detecting whether an interaction occurs between the virtual object and environment in the game scene is added to the virtual object.

In a step S502, in response to the third collider detecting that the interaction occurs between the virtual object and the environment in the game scene, a spring constraint is added to the virtual object according to a positional relationship between the virtual object and the environment in the game scene.

In some cases, after the interaction occurs between the virtual object and the virtual vehicle, the virtual object will move in a reciprocating motion under the reaction of the ground. For example, after the virtual car collides with the virtual tree, the virtual tree will not fall directly to the ground. Instead, the canopy of the virtual tree will first slow down after contacting with the ground, and then bounce back, and such interaction cycle between the canopy of the virtual tree and the ground will continue until the virtual tree comes to a complete standstill. According to embodiments, the spring constraint can be added to the virtual object to simulate the motion of the virtual object and to realize above effects.

Unlike the joint constraint described above, the spring constraint is not added in the first frame after the interaction occurs. Usually, the spring constraint will not be added until the simulation of the interaction process arrives at a certain stage. That is, the spring constraint needs to be added at an appropriate time according to the positional relationship between the virtual object and the environment in the game scene.

For example, in an actual interaction process, after contacting with the ground, the canopy will first slow down and then bounce back. Such interaction cycle continues until the virtual tree comes to a complete standstill. In this case, the spring constraint is added when the canopy is in contact with the ground. In some embodiments, a third collider can be added to the virtual object. The third collider is used to detect changes in the positional relationship between the virtual object and the environment in the game scene, and after the interaction is detected, for example, when the virtual object begins to contact with the ground in the game scene, the spring constraint is added to the virtual object to simulate the constraint on the virtual object exerted by the ground.

In some embodiments, a shape of the third collider added to the virtual object may be consistent with the shape of the collider that is added to the object and brings a specific role of the object into play, and the third collider can be configured to be able to interact with the environment in the game scene. Take the virtual tree as the virtual object as an example, the shape of the third collider can be the size of the bounding box of the virtual tree, the bounding box including the trunk and the canopy of the virtual tree, rather than the size of the bounding box including only the trunk part (the part that interacts with the virtual vehicle).

In some embodiments, when the interaction occurring between the virtual object and the environment in the game scene is detected based on the third collider, the spring constraint is added to the virtual object, and an occurrence range of the spring constraint is $\theta_t < \theta_0$ or $\theta_t > \theta_0 + k\theta_1$, wherein $\theta_0$ is an angle of the virtual object when the interaction occurring between the virtual object and the environment, k represents magnification of the virtual object, and $\theta_1$ is a constant related to the type of virtual object. The strength and damping of the spring can be determined as:

$$k'_{strength} = kk_{strength}, k'_{damping} = kk_{damping},$$

where $k_{strength}$ and $k_{damping}$ are respectively the strength and damping of the spring constraint of the virtual object without magnification.

It should be noted that, for any virtual object, the strength $k_{strength}$ and the damping $k_{damping}$ of the spring constraint corresponding the virtual object are fixed. However, when in different game scenes, due to different scales of the virtual object, the effect displayed by the virtual object in the game interface is also different, that is, the size of the same virtual object may be different in different game scenes. In some embodiments, the strength and damping of the virtual object in the game scene can be determined, according to the magnification of the virtual object in different game scenes and the strength $k_{strength}$ and the damping $k_{damping}$ of the spring constraint corresponding the virtual object, thereby adding the spring constraint to virtual object according to the strength and the damping determined.

In some embodiments, above step S402, in which the motion of the virtual object after the interaction occurs between the virtual object and the virtual vehicle is simulated by mean of the second collider, according to the joint and the impulse of and the virtual object, may include the following step, the motion of the virtual object after the interaction occurs between the virtual object and the virtual vehicle is simulated, based on the second collider, according to the joint, the impulse of the virtual object, and the spring constraint.

In some embodiments, parameters of the second collider can be constructed according to the joint, the impulse of the virtual object, and the spring constraint. The second collider with above joint constraint and spring constraint can be constructed, so that the interaction process between the virtual object and the virtual vehicle can be simulated based on the second collider.

Figure 8:
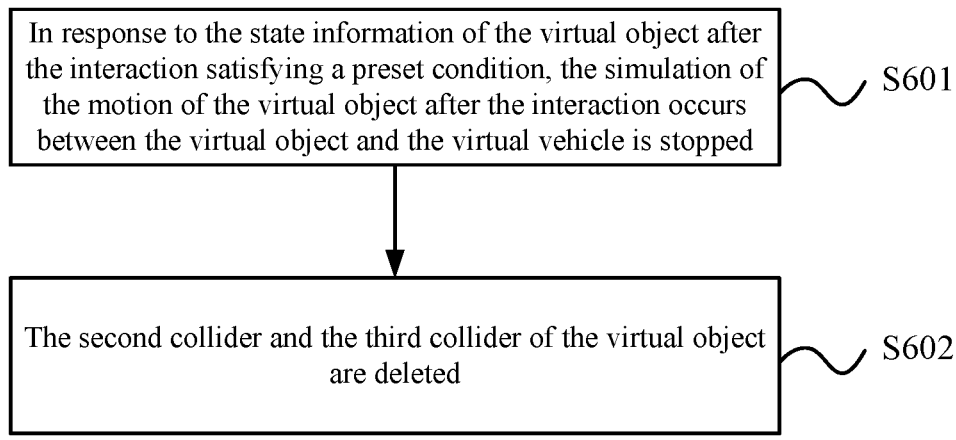
FIG. 8 is a schematic flowchart of another information processing method according to an embodiment of the present disclosure.

FIG. 8 is a schematic flowchart of another information processing method according to an embodiment of the present disclosure. In some embodiments, as shown in FIG. 8, the method of the present disclosure may further include following steps.

In a step S601, in response to the state information of the virtual object after the interaction satisfying a preset condition, the simulation of the motion of the virtual object after the interaction occurs between the virtual object and the virtual vehicle is stopped.

In a step S602, the second collider and the third collider of the virtual object are deleted.

In some embodiments, after the interaction occurs, when the angular velocity of the virtual object rotating around the constraint point satisfies the following stop condition: $\|v_t\| \le v_{th}$, it is determined that the simulation is over.

Regarding above formula, where with is a constant, which can be determined according to the accuracy requirements of the simulation, and $v_t$ represents the angular velocity of the virtual object rotating around the constraint point, which tends to decay gradually during the motion after the interaction.

In some embodiments, after it is determined that the simulation process is over, the above-mentioned second collider, third collider, joint and spring constraints added to the virtual object may be removed to reduce unnecessary performance consumption and memory consumption.

In some embodiments, before above step S101, that is, before detecting, based on a first collider of a virtual object in a game scene, whether an interaction occurs between the virtual object and a virtual vehicle, the method provided by embodiments of the present disclosure may further include the following step, the virtual object is preprocessed in an offline state. In some embodiments, said preprocessing the virtual object may include adding to the virtual object the first collider.

According to embodiments of the present disclosure, the first collider for detecting whether an interaction occurs between the virtual object and a virtual vehicle can be added to the virtual object in an offline state, before the simulation of the interaction process, so that during the execution of the method provided by embodiments of the present disclosure, less additional information requires manual maintenance, so as to reduce runtime consumption, and to extend the application range of the method.

In some embodiments, said preprocessing the virtual object may further include adding a corresponding type identifier to the virtual object.

Both the type identifier and the collider that brings a specific role of the object into play can be added offline.

In some embodiments, said preprocessing is that after the game scene is created, the art designer scans all interactable virtual objects in the scene through a program, and adds corresponding type identifiers to these virtual objects, so that the type of the virtual object can be identified through the type identifier added to the virtual object when the interaction occurs. As a result, the virtual object can be modeled according to the type of the virtual object in a logic of processing the interaction, when the interactions occurs between the virtual object and the virtual vehicle.

Both the first collider and the collider that brings a specific role of the object into play are added to the virtual object, thus the occurrence of interaction can be detected, and also some other uses (such as vision occlusion and halo effects, etc.) are generated. The shape of the collider roughly reflects the shape of the virtual object. The preprocessing is done offline. When the game starts, these preprocessed information and colliders will be loaded into the scene together with the virtual object, so as to provide some information needed for the calculation of the state information of the virtual object during the simulation of the interaction process.

It should be noted that said preprocessing and said simulation of the interaction process are two different workflows. The preprocessing only requires to be done by the art designer once after the game scene is created. The interaction between virtual objects will occur in every game, and the static information of virtual objects required for the interaction can be directly or indirectly derived from the preprocessing of the game scene.

In some embodiments, before adding to the virtual object a second collider for simulating motion of the virtual object in above step S103, the method provided by embodiments of the present disclosure may further include the following step, the first collider of the virtual object is deleted.

In some embodiments, before adding to the virtual object the second collider for simulating the motion of the virtual object after the interaction, the first collider and the collider that brings a specific role of the object into play, which are added to the virtual object in the offline state, can be deleted, so as to reduce memory usage and consumption, and to improve the execution efficiency of method.

In some embodiments, in step S102, in response to detecting that the interaction occurs between the virtual object and the virtual vehicle, the method provided by embodiments of the present disclosure may further include following steps, the type identifier of the virtual object is obtained, and the attribute information of the virtual object is determined according to the type identifier of the virtual object.

In some embodiments, as explained in above embodiments, the type of the virtual object can be identified through the type identifier of the virtual object, so that the virtual object can be modeled according to the type of the virtual object, and during the simulation, the attribute information of the virtual object can be obtained according to the type of the virtual object, thereby facilitating the calculation of the state information of the virtual object after the interaction.

According to embodiments, a first collider and a type identifier are added to the virtual object in an offline state, so that the virtual object can be preprocessed according to the type identifier, which can effectively reduce the runtime consumption of the system.

Figure 9:
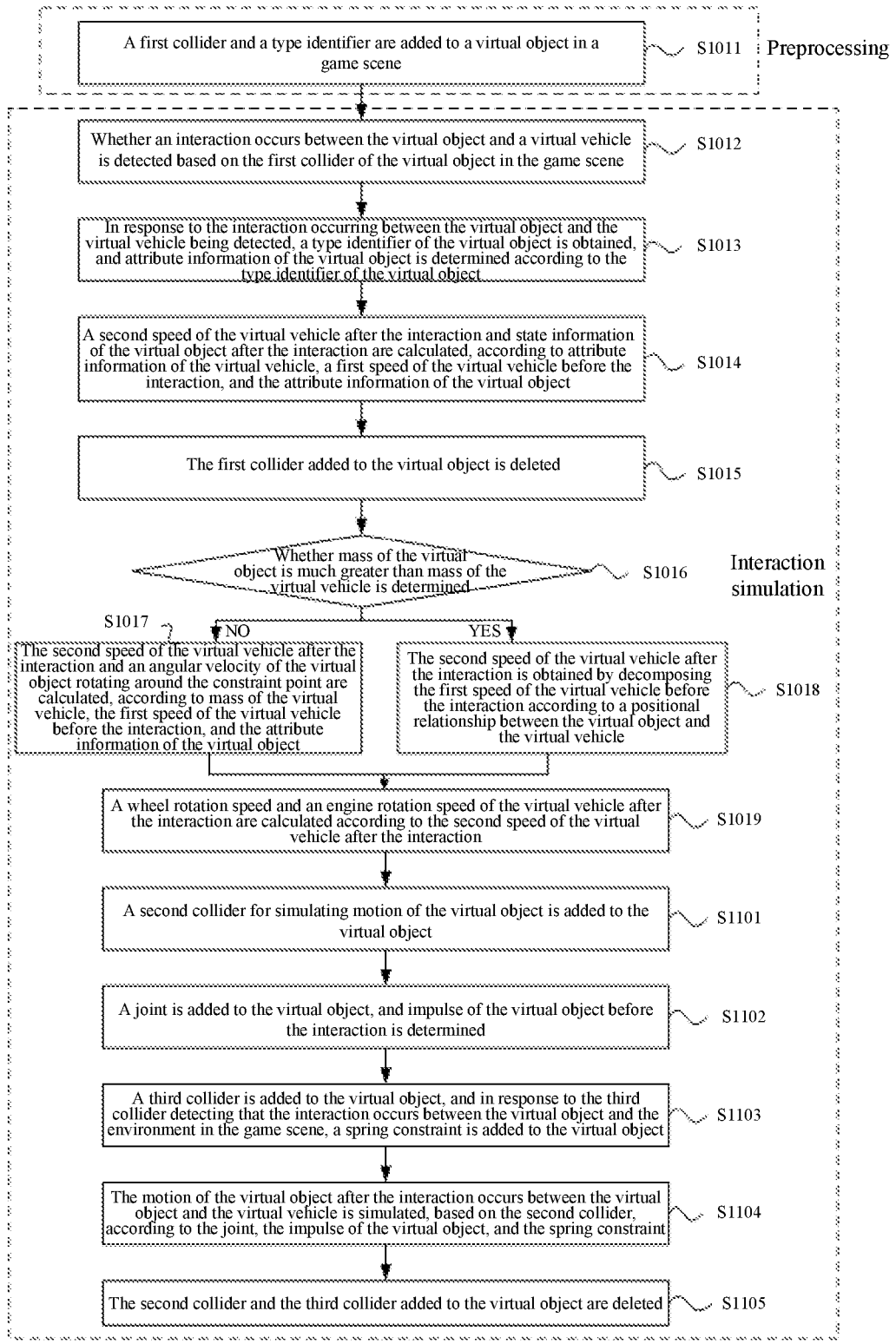
FIG. 9 is a schematic flowchart of an information processing method according to an embodiment of the present disclosure.

FIG. 9 is a schematic flowchart of an information processing method according to an embodiment of the present disclosure. In some embodiments, as shown in FIG. 9, a schematic diagram of an example including a complete flow according to the method of the present disclosure. References are made to FIG. 9, detailed descriptions will be provided to assist the understanding of the solutions of the present disclosure. The example method shown in FIG. 9 include following steps.

In a step S1011, a first collider and a type identifier are added to a virtual object in a game scene.

In a step S1012, whether an interaction occurs between the virtual object and a virtual vehicle is detected based on the first collider of the virtual object in the game scene.

In a step S1013, in response to the interaction occurring between the virtual object and the virtual vehicle being detected, a type identifier of the virtual object is obtained, and attribute information of the virtual object is determined according to the type identifier of the virtual object.

In a step S1014, a second speed of the virtual vehicle after the interaction and state information of the virtual object after the interaction are calculated, according to attribute information of the virtual vehicle, a first speed of the virtual vehicle before the interaction, and the attribute information of the virtual object.

In a step S1015, the first collider added to the virtual object is deleted.

In a step S1016, whether a ratio of mass of the virtual object to the mass of the virtual vehicle is greater than a preset threshold is determined.

In a step S1017, in response to the ratio of the mass of the virtual object to the mass of the virtual vehicle being not greater than the preset threshold, the second speed of the virtual vehicle after the interaction and an angular velocity of the virtual object rotating around the constraint point are calculated, according to mass of the virtual vehicle, the first speed of the virtual vehicle before the interaction, and the attribute information of the virtual object.

In a step S1018, in response to the ratio of the mass of the virtual object to the mass of the virtual vehicle being greater than the preset threshold, the second speed of the virtual vehicle after the interaction is obtained by decomposing the first speed of the virtual vehicle before the interaction according to a positional relationship between the virtual object and the virtual vehicle.

In a step S1019, a wheel rotation speed and an engine rotation speed of the virtual vehicle after the interaction are calculated according to the second speed of the virtual vehicle after the interaction.

In a step S1101, a second collider for simulating motion of the virtual object is added to the virtual object.

In a step S1102, a joint is added to the virtual object, and impulse of the virtual object before the interaction is determined.

In a step S1103, a third collider is added to the virtual object, and in response to the third collider detecting that the interaction occurs between the virtual object and the environment in the game scene, a spring constraint is added to the virtual object.

In a step S1104, the motion of the virtual object after the interaction occurs between the virtual object and the virtual vehicle is simulated, based on the second collider, according to the joint, the impulse of the virtual object, and the spring constraint.

In a step S1105, the second collider and the third collider added to the virtual object are deleted.

According to embodiments, the first collider is deleted before the second collider is added, and the second collider and the third collider are deleted after the simulation ends, which can effectively reduce the usage and consumption of memory, thereby improving the execution efficiency of the method.

Specific implementations and corresponding technical effects of the example method shown in FIG. 9 can be understood with reference to above-mentioned embodiments, which will not be repeated here.

An apparatus, a device, and a storage medium for implementing the information processing method provided by embodiments of the present disclosure will be described below, and specific implementations and corresponding technical effects can be understood with reference to above-mentioned embodiments, and will not be repeated below.

Figure 10:
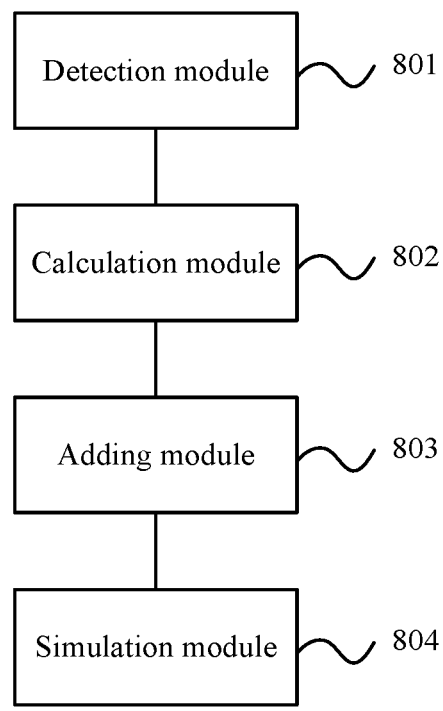
FIG. 10 is a schematic diagram of an information processing apparatus according to an embodiment of the present disclosure.

FIG. 10 is a schematic diagram of an information processing apparatus according to an embodiment of the present disclosure. As shown in FIG. 10, the apparatus may include a detection module 801, a calculation module 802, an adding module 803, and a simulation module 804.

The detection module 801 is configured to detect, based on a first collider of a virtual object in a game scene, whether an interaction occurs between the virtual object and a virtual vehicle.

The calculation module 802 is configured to calculate, in response to detecting that the interaction occurs between the virtual object and the virtual vehicle, a second speed of the virtual vehicle after the interaction and state information of the virtual object after the interaction, according to attribute information of the virtual vehicle, a first speed of the virtual vehicle before the interaction, and attribute information of the virtual object.

The adding module 803 is configured to add to the virtual object a second collider for simulating motion of the virtual object.

The simulation module 804 is configured to simulate, based on the second collider, the motion of the virtual object after the interaction occurs between the virtual object and the virtual vehicle, according to the second speed of the virtual vehicle after the interaction and the state information of the virtual object after the interaction.

In some embodiments, the state information of the virtual object after the interaction includes an angular velocity of the virtual object rotating around a constraint point.

The calculation module 802 is specifically configured to calculate the second speed of the virtual vehicle after the interaction and the angular velocity of the virtual object rotating around the constraint point, according to mass of the virtual vehicle, the first speed of the virtual vehicle before the interaction, and the attribute information of the virtual object.

Figure 11:
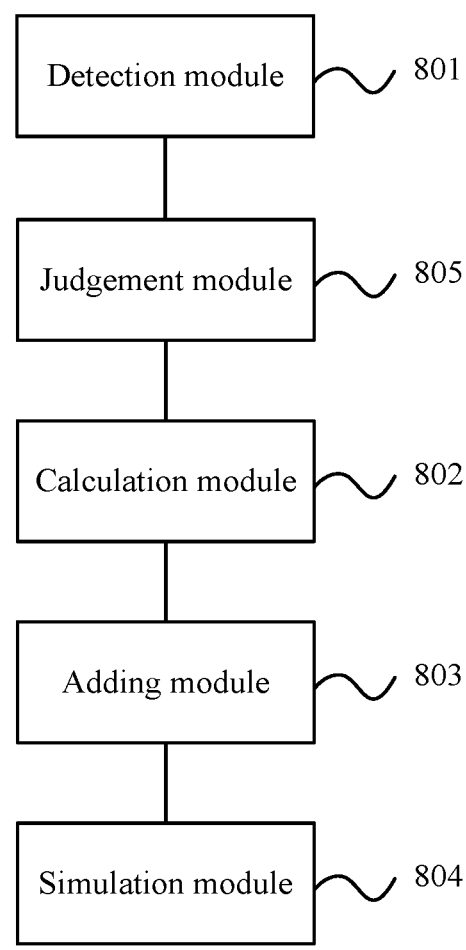
FIG. 11 is a schematic diagram of another information processing apparatus according to an embodiment of the present disclosure.

In some embodiments, as shown in FIG. 11, the apparatus further includes a judgement module 805.

The judgement module 805 is configured to determine whether a ratio of mass of the virtual object to the mass of the virtual vehicle is greater than a preset threshold. In response to the ratio of the mass of the virtual object to the mass of the virtual vehicle being greater than the preset threshold, the calculation module is specifically configured to obtain the second speed of the virtual vehicle after the interaction by decomposing the first speed of the virtual vehicle before the interaction according to a positional relationship between the virtual object and the virtual vehicle.

In some embodiments, the calculation module 802 is further configured to calculate a wheel rotation speed and an engine rotation speed of the virtual vehicle after the interaction according to the second speed of the virtual vehicle after the interaction.

In some embodiments, the adding module 803 is specifically configured to obtain physical parameters of the second collider according to a shape of the first collider and the attribute information of the virtual object; and add to the virtual object the second collider according to the physical parameters of the second collider.

In some embodiments, the physical parameters of the second collider include a shape, a height, and a center of mass.

The adding module 803 is specifically configured to determine the shape of the second collider according to the shape of the first collider and a height of the virtual object; determine the height of the second collider according to a height of the virtual object relative to a ground in the game scene; and determine the center of mass of the second collider according to the height of the second collider.

In some embodiments, the adding module 803 is further configured to add to the virtual object a joint for simulating a constraint on the virtual object exerted by a ground in the game scene.

The adding module 803 is specifically configured to determine position information of the joint according to position information of the virtual object and the second speed of the virtual vehicle after the interaction; and add the joint between the virtual object and the ground in the game scene according to the position information of the joint.

In some embodiments, the simulation module 804 is specifically configured to determine impulse of the virtual object before the interaction according to the angular velocity of the virtual object rotating around the constraint point and preset moment of inertia of the virtual object; and simulate, based on the second collider, the motion of the virtual object after the interaction occurs between the virtual object and the virtual vehicle according to the joint and the impulse of the virtual object.

In some embodiments, the adding module 803 is further configured to add to the virtual object a third collider for detecting whether an interaction occurs between the virtual object and environment in the game scene; and add, in response to the third collider detecting that the interaction occurs between the virtual object and the environment in the game scene, to the virtual object a spring constraint, according to a positional relationship between the virtual object and the environment in the game scene.

The simulation module 804 is specifically configured to simulate, based on the second collider, the motion of the virtual object after the interaction occurs between the virtual object and the virtual vehicle, according to the joint, the impulse of the virtual object, and the spring constraint.

Figure 12:
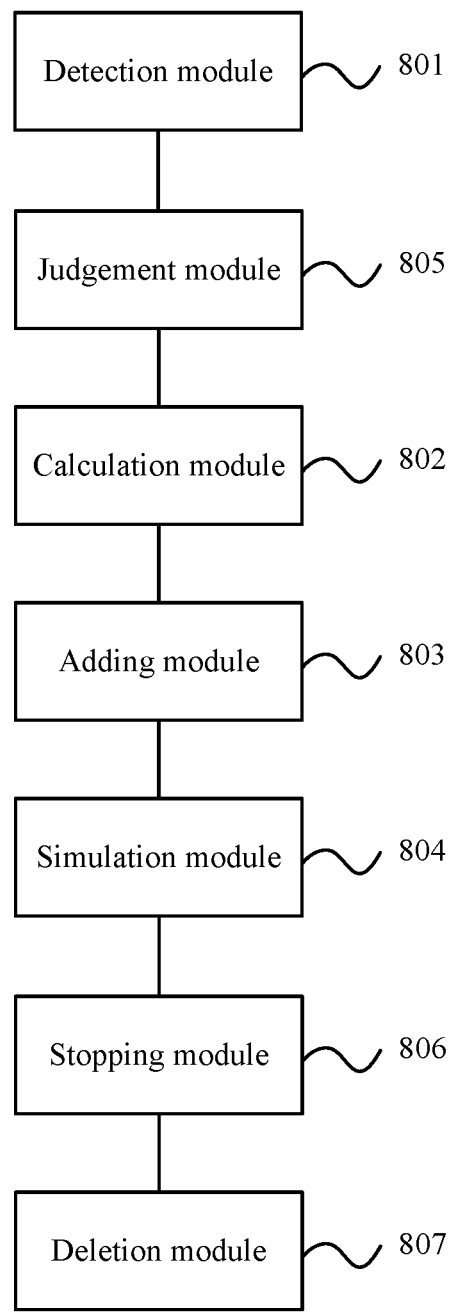
FIG. 12 is a schematic diagram of another information processing apparatus according to an embodiment of the present disclosure.

In some embodiments, as shown in FIG. 12, the apparatus further includes a stopping module 806 and a deletion module 807.

The stopping module 806 is configured to stop, in response to the state information of the virtual object after the interaction satisfying a preset condition, simulating the motion of the virtual object after the interaction occurs between the virtual object and the virtual vehicle.

The deletion module 807 is configured to delete the second collider and the third collider of the virtual object.

Figure 13:
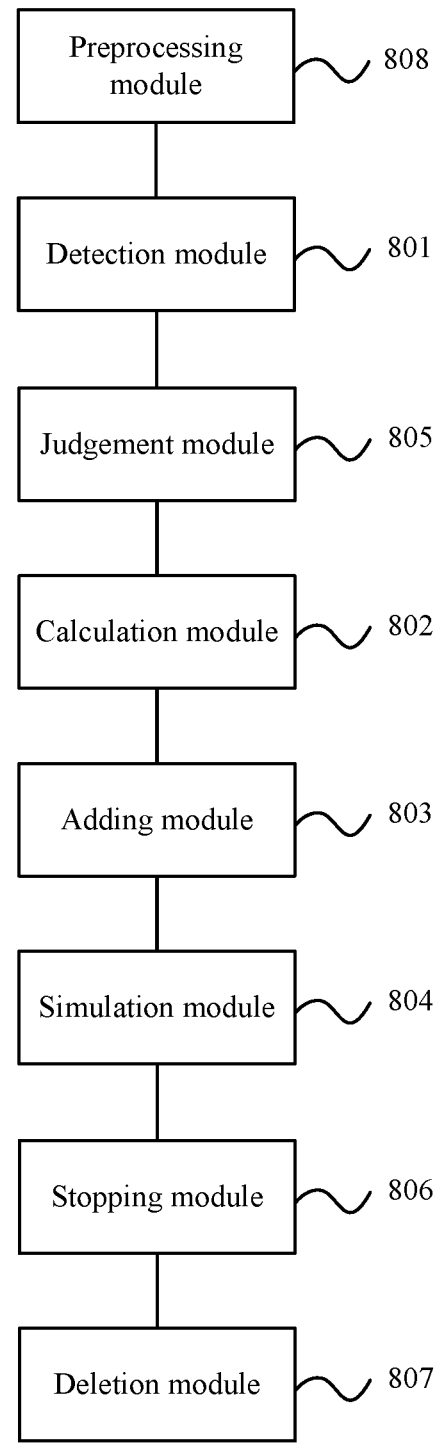
FIG. 13 is a schematic diagram of another information processing apparatus according to an embodiment of the present disclosure.

In some embodiments, as shown in FIG. 13, the apparatus further includes a preprocessing module 808.

The preprocessing module 808 is configured to preprocess the virtual object in an offline state.

In some embodiments, the preprocessing module 808 is specifically configured to add to the virtual object the first collider.

In some embodiments, the deletion module 807 is further configured to delete the first collider of the virtual object.

In some embodiments, the adding module 803 is further configured to add to the virtual object a corresponding type identifier.

Figure 14:
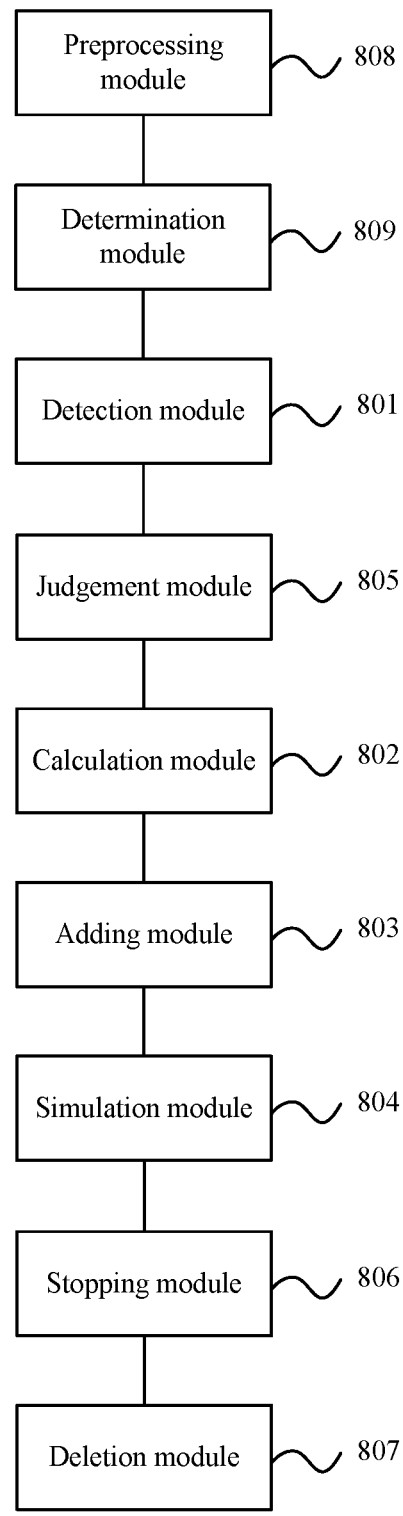
FIG. 14 is a schematic diagram of another information processing apparatus according to an embodiment of the present disclosure.

In some embodiments, as shown in FIG. 14, the apparatus further includes a determination module 809.

The determination module 809 is configured to obtain the type identifier of the virtual object, and determine the attribute information of the virtual object according to the type identifier of the virtual object.

The apparatus in above embodiments is used to implement the method provided by embodiments of the present disclosure, and specific implementations and corresponding technical effects can be understood with reference to above-mentioned embodiments, and will not be repeated here.

The above modules may be one or more integrated circuits configured to implement above methods, for example, one or more specific integrated circuits (Application Specific Integrated Circuit, ASIC), or one or more microprocessors (Digital Signal Processor, DSP), or one or more Field Programmable Gate Arrays (FPGA), etc. For another example, when some of the above modules are implemented by calling program codes by a processing element, the processing element may be a general-purpose processor, such as a central processing unit (CPU) or other processors that can call program codes. For another example, these modules can be integrated together and implemented in the form of a system-on-a-chip (SOC).

Figure 15:
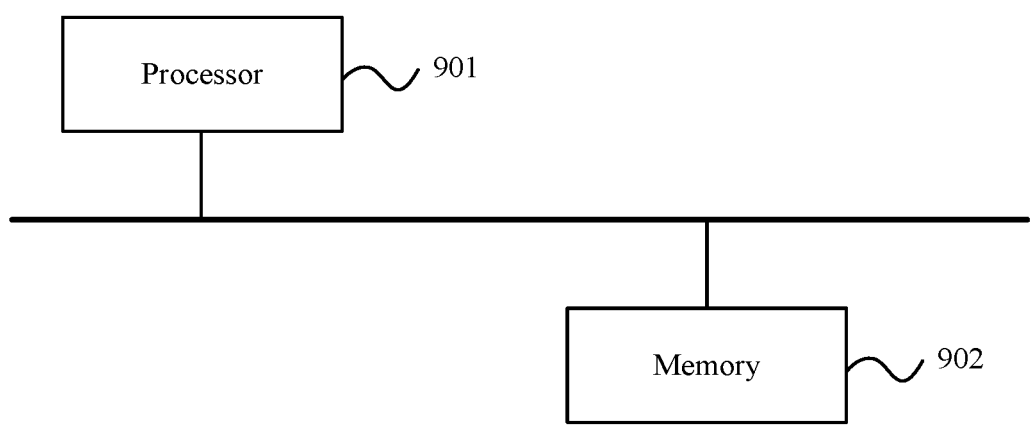
FIG. 15 is a schematic structural diagram of an information processing device according to an embodiment of the present disclosure.

FIG. 15 is a schematic structural diagram of an information processing device according to an embodiment of the present disclosure. The information processing device may be a game client or a game server.

The information processing device includes a processor 901 and a memory 902.

The memory 902 is used for storing programs, and the processor 901 can call the programs stored in the memory 902 to implement the method provided in above embodiments. Specific implementations and corresponding technical effects can be understood with reference to above-mentioned embodiments, and will not be repeated here.

In some embodiments, embodiments of the present disclosure further provide a program product, such as a computer-readable storage medium including a program, which when executed by a processor, causes the method provided in above embodiments to be implemented.

According to embodiments provided in the present disclosure, it should be understood that the apparatus and method disclosed may be implemented in other manners. For example, the apparatus embodiments described above are only illustrative. For example, division of units is only a logical function division. In a practice implementation, there may be other divisions. For example, multiple units or components can be combined or can be integrated into another system, or some features can be ignored, or not implemented. In addition, mutual coupling or direct coupling or communication connection shown or discussed may be indirect coupling or communication connection through some interfaces, devices or units, and may be in electrical, mechanical or other forms.

The units described as separate components may or may not be physically separated, and components displayed as units may or may not be physical units. That is, the components displayed as units may be located in one place, or may be distributed to multiple network units. Some or all of the units may be selected according to actual needs to implement solutions provided in embodiments.

In addition, functional units provided in embodiments of the present disclosure may be integrated into one processing unit, or the functional units may exist physically alone, or two or more functional units may be integrated into one unit. The above-mentioned integrated units may be implemented in the form of hardware, or may be implemented in the form of hardware and software functional units.

The above-mentioned integrated functional units implemented in the form of software can be stored in a computer-readable storage medium. The above-mentioned software functional unit is stored in a storage medium, and includes several instructions to cause a computer device (which may be a personal computer, a server, or a network device, etc.) or a processor to implement part of the method provided in various embodiments of the present disclosure. The aforementioned storage medium includes various media that can store program codes, such as U disk, mobile hard disk, read-only memory (ROM), random access memory (RAM), magnetic disk or optical disk, etc.

What is claimed is:

1. An information processing method, comprising:
    detecting, based on a first collider of a virtual object in a game scene, whether an interaction occurs between the virtual object and a virtual vehicle;
    calculating, in response to detecting that the interaction occurs between the virtual object and the virtual vehicle, a second speed of the virtual vehicle after the interaction and state information of the virtual object after the interaction, according to attribute information of the virtual vehicle, a first speed of the virtual vehicle before the interaction, and attribute information of the virtual object;
    adding to the virtual object a second collider for simulating motion of the virtual object; and
    simulating, based on the second collider, the motion of the virtual object after the interaction occurs between the virtual object and the virtual vehicle, according to the second speed of the virtual vehicle after the interaction and the state information of the virtual object after the interaction.

2. The method according to claim 1, wherein the state information of the virtual object after the interaction comprises an angular velocity of the virtual object rotating around a constraint point; and
    wherein calculating the second speed of the virtual vehicle after the interaction and the state information of the virtual object after the interaction, according to the attribute information of the virtual vehicle, the first speed of the virtual vehicle before the interaction, and the attribute information of the virtual object comprises:
    calculating the second speed of the virtual vehicle after the interaction and the angular velocity of the virtual object rotating around the constraint point, according to mass of the virtual vehicle, the first speed of the virtual vehicle before the interaction, and the attribute information of the virtual object.

3. The method according to claim 2, further comprising:
    determining whether a ratio of mass of the virtual object to the mass of the virtual vehicle is greater than a preset threshold; and
    wherein said calculating the second speed of the virtual vehicle after the interaction comprises:
    obtaining, in response to the ratio of the mass of the virtual object to the mass of the virtual vehicle being greater than the preset threshold, the second speed of the virtual vehicle after the interaction by decomposing the first speed of the virtual vehicle before the interaction according to a positional relationship between the virtual object and the virtual vehicle.

4. The method according to claim 2, further comprising:
    calculating a wheel rotation speed and an engine rotation speed of the virtual vehicle after the interaction according to the second speed of the virtual vehicle after the interaction.

5. The method according to claim 1, wherein said adding to the virtual object a second collider for simulating motion of the virtual object comprises:
    obtaining physical parameters of the second collider according to a shape of the first collider and the attribute information of the virtual object; and adding to the virtual object the second collider according to the physical parameters of the second collider.

6. The method according to claim 5, wherein the physical parameters of the second collider comprise a shape, a height, and a center of mass; and wherein said obtaining physical parameters of the second collider according to a shape of the first collider and the attribute information of the virtual object comprises:

determining the shape of the second collider according to the shape of the first collider and a height of the virtual object;

determining the height of the second collider according to a height of the virtual object relative to a ground in the game scene; and determining the center of mass of the second collider according to the height of the second collider.

7. The method according to claim 2, further comprising:
adding to the virtual object a joint for simulating a constraint on the virtual object exerted by a ground in the game scene, wherein said adding to the virtual object a joint comprises:

determining position information of the joint according to position information of the virtual object and the second speed of the virtual vehicle after the interaction; and adding the joint between the virtual object and the ground in the game scene according to the position information of the joint.

8. The method according to claim 7, wherein said simulating, based on the second collider, the motion of the virtual object after the interaction occurs between the virtual object and the virtual vehicle, according to the second speed of the virtual vehicle after the interaction and the state information of the virtual object after the interaction comprises:

determining impulse of the virtual object before the interaction according to the angular velocity of the virtual object rotating around the constraint point and preset moment of inertia of the virtual object; and simulating, based on the second collider, the motion of the virtual object after the interaction occurs between the virtual object and the virtual vehicle according to the joint and the impulse of the virtual object.

9. The method according to claim 8, further comprising:
adding to the virtual object a third collider for detecting whether another interaction occurs between the virtual object and environment in the game scene; and adding, in response to detecting, based on the third collider, that another interaction occurs between the virtual object and the environment in the game scene, to the virtual object a spring constraint, according to a positional relationship between the virtual object and the environment in the game scene; and wherein said simulating, based on the second collider, the motion of the virtual object after the interaction occurs between the virtual object and the virtual vehicle, according to the joint and the impulse of the virtual object comprises:

simulating, based on the second collider, the motion of the virtual object after the simulating, based on the second collider, the motion of the virtual object after the interaction occurs between the virtual object and the virtual vehicle, according to the joint, the impulse of the virtual object, and the spring constraint.

10. The method according to claim 9, further comprising:
stopping, in response to the state information of the virtual object after the interaction satisfying a preset condition, simulating the motion of the virtual object after the interaction occurs between the virtual object and the virtual vehicle; and deleting the second collider and the third collider of the virtual object.

11. The method according to claim 1, wherein further comprising:
preprocessing the virtual object in an offline state.

12. The method of claim 11, wherein said preprocessing the virtual object comprises adding to the virtual object the first collider.

13. The method according to claim 5, further comprising:
deleting the first collider of the virtual object before adding to the virtual object the second collider for simulating the motion of the virtual object.

14. The method according to claim 11, wherein said preprocessing the virtual object further comprises adding to the virtual object a corresponding type identifier; and wherein the method further comprises:
obtaining, in response to detecting that the interaction occurs between the virtual object and the virtual vehicle, the type identifier of the virtual object; and determining the attribute information of the virtual object according to the type identifier of the virtual object.

15. An information processing device, comprising a processor, a storage medium, and a bus, wherein the storage medium stores program instructions executable by the processor, and when the information processing device operates, the processor and the storage medium communicate through the bus, and the processor executes the program instructions, to implement an information processing method, comprising:

detecting, based on a first collider of a virtual object in a game scene, whether an interaction occurs between the virtual object and a virtual vehicle;

calculating, in response to detecting that the interaction occurs between the virtual object and the virtual vehicle, a second speed of the virtual vehicle after the interaction and state information of the virtual object after the interaction, according to attribute information of the virtual vehicle, a first speed of the virtual vehicle before the interaction, and attribute information of the virtual object;

adding to the virtual object a second collider for simulating motion of the virtual object; and simulating, based on the second collider, the motion of the virtual object after the interaction occurs between the virtual object and the virtual vehicle, according to the second speed of the virtual vehicle after the interaction and the state information of the virtual object after the interaction.

16. The device according to claim 15, wherein the state information of the virtual object after the interaction comprises an angular velocity of the virtual object rotating around a constraint point; and wherein the processor is configured to:

calculate the second speed of the virtual vehicle after the interaction and the angular velocity of the virtual object rotating around the constraint point, according to mass of the virtual vehicle, the first speed of the virtual vehicle before the interaction, and the attribute information of the virtual object.

17. The device according to claim 16, wherein the processor is further configured to:

add to the virtual object a joint for simulating a constraint on the virtual object exerted by a ground in the game scene, and wherein the processor is further configured to:
  determine position information of the joint according to position information of the virtual object and the second speed of the virtual vehicle after the interaction; and
  add the joint between the virtual object and the ground in the game scene according to the position information of the joint.

18. The device according to claim 17, wherein the processor is further configured to:
  determine impulse of the virtual object before the interaction according to the angular velocity of the virtual object rotating around the constraint point and preset moment of inertia of the virtual object; and
  simulate, based on the second collider, the motion of the virtual object after the interaction occurs between the virtual object and the virtual vehicle according to the joint and the impulse of the virtual object.

19. The device according to claim 18, wherein the processor is further configured to:
  add to the virtual object a third collider for detecting whether another interaction occurs between the virtual object and environment in the game scene; and
  add, in response to detecting, based on the third collider, that another interaction occurs between the virtual object and the environment in the game scene, to the virtual object a spring constraint, according to a positional relationship between the virtual object and the environment in the game scene; and wherein the processor is further configured to:
  simulate, based on the second collider, the motion of the virtual object after the interaction occurs between the virtual object and the virtual vehicle, according to the joint, the impulse of the virtual object, and the spring constraint.

20. A computer-readable storage medium having a computer program stored thereon, which when executed by a processor, causes an information processing method to be implemented, wherein the information processing method comprises:
  detecting, based on a first collider of a virtual object in a game scene, whether an interaction occurs between the virtual object and a virtual vehicle;
  calculating, in response to detecting that the interaction occurs between the virtual object and the virtual vehicle, a second speed of the virtual vehicle after the interaction and state information of the virtual object after the interaction, according to attribute information of the virtual vehicle, a first speed of the virtual vehicle before the interaction, and attribute information of the virtual object;
  adding to the virtual object a second collider for simulating motion of the virtual object; and
  simulating, based on the second collider, the motion of the virtual object after the interaction occurs between the virtual object and the virtual vehicle, according to the second speed of the virtual vehicle after the interaction and the state information of the virtual object after the interaction.

* * * * *